J. F. APPINGER.
CHANGE SPEED MECHANISM.
APPLICATION FILED OCT. 4, 1909.

968,519.

Patented Aug. 30, 1910.

WITNESSES:
M. Schmid.
C. Schallinger

INVENTOR
Johann F. Appinger
BY
B. Singer
ATTORNEY

UNITED STATES PATENT OFFICE.

JOHANN FRIEDRICH APPINGER, OF NUREMBERG, GERMANY, ASSIGNOR TO AUTOMOBILWERKE UNION ACTIENGESELLSCHAFT, OF NUREMBERG, GERMANY.

CHANGE-SPEED MECHANISM.

968,519.   Specification of Letters Patent.   Patented Aug. 30, 1910.

Application filed October 4, 1909. Serial No. 520,885.

*To all whom it may concern:*

Be it known that I, JOHANN FRIEDRICH APPINGER, of Nuremberg, Bavaria, Germany, have invented an Improvement in or Relating to Change-Speed Mechanism, of which the following description, in connection with the accompanying drawings, is a specification.

This invention relates to a driving device for changing speeds, chiefly intended to be used in motor vehicles. In the new driving gearing friction wheels are used. It is of course well known in itself to use friction wheels for the transmission of power.

The novel feature of this invention is however, the special arrangement for quick changing of speeds on the driven spindle, as well as the special construction of the friction wheel which is simultaneously utilized as a member of a friction clutch.

Figure 1:
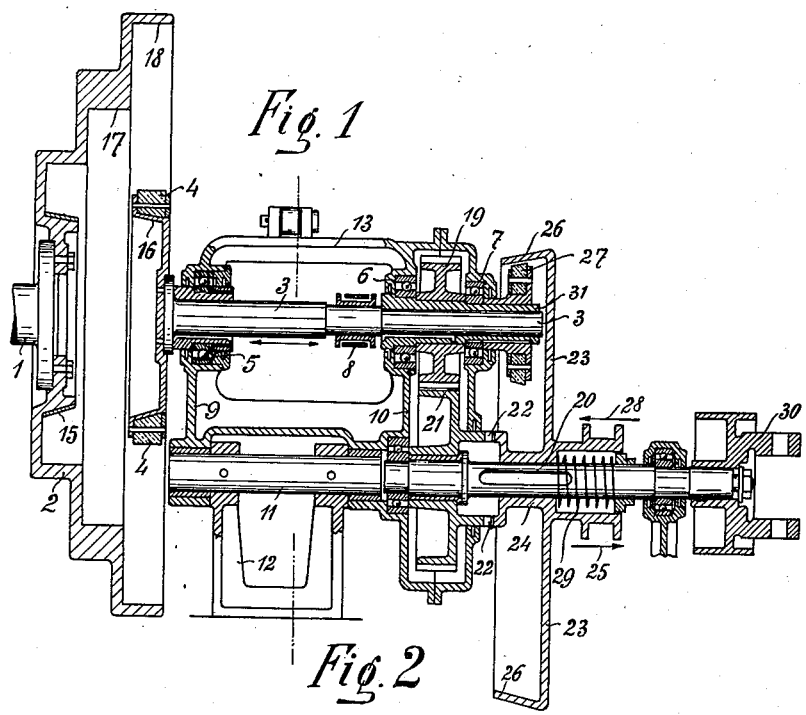
Figure 2:
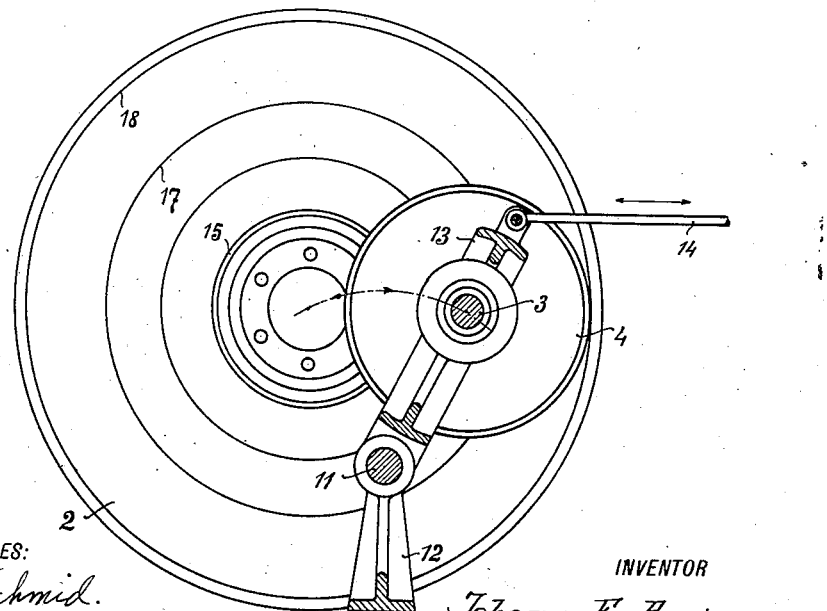

A construction according to this invention is illustrated by way of example in Figures 1 and 2 of the accompanying drawing which are respectively a longitudinal section and cross-section.

1 is the motor spindle connected to the step pulley 2. The driven spindle 3 carries a friction wheel 4. The spindle 3 is mounted in bearings 5, 6 and 7 in a longitudinally adjustable manner, and is moved backward and forward at will by means of a system of levers suitably engaging with the spindle collar or ring 8. The bearings 5, 6 and 7 are mounted on the arms 9 and 10 of a part 13 rotatable about the spindle 11. The spindle 11 is mounted in the stationary bracket 12 so that it cannot be shifted, and is eccentric relatively to the driving shaft 1. The spindle 3, and with it the friction pulley 4, can, therefore, oscillate about the spindle 11. This movement is started and limited by suitably arranged levers, the end lever 14 of which is pivoted to the part 13. The pulley 4 is further of such construction that, in addition to being capable of being used as a friction pulley, it can also be used as a member of a friction clutch. It is, therefore, under cut at the inner edge 16, so that it fits the other clutch half of suitable construction provided in the step pulley 2. For the ordinary or normal speed of motor vehicles, the pulley 4 or the clutch half 16 is pushed over the clutch half 15. The annular pulley 15 is preferably faced in well known manner with leather or the like, so as to insure friction.

If it is desired to have a greater number of revolutions of the driven spindle 3, the said spindle 3, or the pulley 4, are moved longitudinally backward, so that the clutch 15 16 is disengaged. The spindle 3, or the pulley 4 is then swung to the side until it strikes the corresponding step 17 or 18. In the drawing, the spindle 3 is longitudinally shifted to such an extent that the pulley 4 must strike the outer step 18. It is obvious that a pulley could be used with a still larger number of steps the action remaining the same. The pulley 4 can, therefore, be used both as a friction wheel and as a clutch half, and this construction of the pulley 4 is one of the most important points of the present invention. It is also obvious that it would be possible to provide the step pulley 2 or 17, 18 and the pulley 4, with corresponding teeth fitted into each other, the action remaining the same.

Since change speed gears for the driving spindle, if they are to be suitable for motor vehicles, must make it possible to combine with them in a simple manner a reversing device, it is necessary to show in which way the reversing device is provided in the above described gear. On the spindle 3 is mounted, by means of a sleeve 31, a toothed wheel 19 which transmits the movement of the said spindle to the toothed wheel 21 mounted loose on the spindle 20. The toothed wheel 21 is formed at the side into a claw clutch half 22, the other half of which clutch is suitably connected to the hub 24, of the pulley 23. The pulley 23 is keyed to the spindle 20 in such manner that it is laterally adjustable. If, therefore, the pulley 23 is moved aside in the direction of the arrow 25 shown in the drawing, the edge of the pulley 26 will be pressed against the friction wheel 27 keyed to the spindle 3 by means of the sleeve 31. At the same time the clutch 22 is disengaged. The movement of the spindle 3 is consequently transmitted through the wheel 27 to the pulley 23 and therefore to the spindle 20 which is then rotated in the same direction as the main spindle 1. If, on the contrary, the pulley 23 is again pushed back in the direction of the arrow 28, or if after the release of the corresponding levers, the previously tensioned spring 29 again pushes back the pulley 23, the clutch 22 is again brought into engagement. At the same time the rim of the wheel 26 is disengaged from the pulley 27, so that the movement of the spindle 3 is transmitted by the wheels 19, 21, clutch 22 and pulley 23 to the spindle 20 which rotates then in the opposite direction to that of the spindle 1. To the spindle 20 is coupled a Cardan joint 30 for starting or transmitting the rotations to the corresponding axles.

Having now particularly described and ascertained the nature of my said invention and in what manner the same is to be performed, I declare that what I claim is:—

1. A change speed gearing comprising in combination, a driving wheel provided with annular change speed faces of different diameters and a tapering annular male clutch member, a supporting shaft eccentrically disposed with respect to said driving wheel, a frame pivotally mounted on said supporting shaft and having bearings arranged to be axially alined with said driving wheel when said frame is swung into one position, a driven shaft in said bearings, a driven wheel mounted on said driven shaft for engagement with said speed faces and provided with a tapering female clutch member, means for swinging said frame abreast of said wheel, means for adjusting said driven shaft longitudinally to aline said driven wheel with one of said speed faces or engage said clutch members, a friction wheel fixed against longitudinal movement and connected to the driven shaft to rotate therewith, a power shaft 20 co-axially arranged with respect to said supporting shaft, a friction wheel slidable and non-rotatively fixed on said power shaft and engaging said anchored friction wheel, and means for moving said slidable friction wheel into and out of engagement with said anchored wheel.

2. A change speed gearing comprising in combination, a driving wheel provided with annular change speed faces of different diameters, a supporting shaft eccentrically disposed with respect to said driving wheel, a frame pivotally mounted on said supporting shaft having bearings arranged to be axially alined with said driving wheel when said frame is swung into one position, a driven shaft in said bearings, a driven wheel mounted on said driven shaft for engagement with said faces, means for swinging said frame abreast of said driving wheel, means for adjusting said driven shaft longitudinally to aline said driven wheel with any one of said speed faces, a friction wheel fixed against longitudinal movement and connected to the driven shaft to rotate therewith, a power shaft 20 coaxially arranged with respect to said supporting shaft, a friction wheel slidable and non-rotatively fixed on said supporting shaft and engaging said anchored friction wheel, and means for moving said slidable friction wheel into and out of engagement with said anchored wheel.

3. A change speed gearing comprising in combination, a driving wheel provided with annular change speed faces of different diameters, a supporting shaft eccentrically disposed with respect to said driving wheel, a frame pivotally mounted on said supporting shaft and having bearings arranged to be axially alined with said driving wheel when said frame is swung into one position, a driven shaft in said bearings, a driven wheel mounted on said driven shaft for engagement with said speed faces, means for swinging said frame abreast of said driving wheel, means for adjusting said driven shaft longitudinally to aline said driven wheel with said speed faces, a friction wheel fixed against longitudinal movement and connected to said driven shaft to rotate therewith, a power shaft 20 co-axially arranged with respect to said supporting shaft, a power friction wheel non-rotatively and slidably mounted on said power shaft and provided with a tapering flange overhanging said anchored friction wheel, and means for moving said power friction wheel into and out of engagement with said anchored friction wheel.

4. A change speed gearing comprising in combination, a driving wheel provided with annular change speed faces of different diameters, a supporting shaft eccentrically disposed with respect to said driving wheel, a frame pivotally mounted on said supporting shaft and having bearings arranged to be axially alined with said driving wheel when said frame is swung into one position, a driven shaft in said bearings, a driven wheel mounted on said driven shaft for engagement with said speed faces, means for swinging said frame abreast of said driving wheel, means for longitudinally adjusting said driven shaft to engage said driven wheel with said speed faces, a power shaft 20 co-axially alined with said supporting shaft, gears connecting said driven and power shafts, the power shaft gear having a clutch member, a friction wheel mounted on said driven shaft, and a power friction wheel mounted on said power shaft and engaging said first mentioned friction wheel, said power friction wheel having a clutch adapted for engagement with said gear clutch, and means for moving said power friction wheel in one direction to engage said gear clutch and disengage said friction wheel and in another direction to disengage said gear clutch and engage said friction wheel.

5. A change speed gearing comprising in combination, a driving wheel provided with a plurality of speed faces, a driven shaft, a driven wheel on said driven shaft for engagement with said speed faces, a frame carrying said driven shaft and pivoted to swing said driven wheel into engagement with said faces, a friction wheel on said driven shaft, a power shaft, a second friction wheel on said power shaft for engagement with said first named friction wheel, gears connecting said driven and power shafts, one of said gears and said second friction wheel having coacting clutch members, and means for moving said power friction wheel in one direction to engage said clutches and disengage said friction wheel and in another direction to disengage said clutches and engage said friction wheel.

6. A change speed gearing comprising in combination, a driving wheel provided with a plurality of change speed faces, a driven shaft, a driven wheel on said driven shaft for engagement with said speed faces, a frame carrying said driven shaft and pivoted to swing said driven wheel into engagement with said change speed faces, a friction wheel on said driven shaft, a power shaft, a second friction wheel slidably mounted on said power shaft and provided with a tapering flange overhanging said first named friction wheel, and means for moving said power wheel into and out of engagement with said first named friction wheel.

7. A change speed gearing comprising in combination, a driving wheel provided with a plurality of change speed faces, a driven shaft, a driven wheel on said driven shaft for engagement with said speed faces, a frame carrying said driven shaft and pivoted to swing said driven wheel into engagement with said speed faces, a friction wheel on said driven shaft, a power shaft coaxially arranged with respect to the pivot of said frame, a second friction wheel slidably mounted on said power shaft, and means for moving said second friction wheel into and out of engagement with said first named friction wheel.

8. A change speed gearing comprising in combination, a driving wheel provided with a plurality of change speed faces and a clutch member, a supporting shaft eccentrically disposed with respect to said driving wheel, a driven shaft and a driven wheel mounted on said shaft, a frame pivotally mounted on said supporting shaft and supporting said driven shaft and arranged to swing the same in axial alinement with said driving wheel and to swing said driven wheel into engagement with said speed faces, said driven wheel having a clutch member adapted for engagement with the clutch member of said driving wheel, a friction wheel on said driven shaft, a power shaft coaxially arranged with respect to said supporting shaft, a second friction wheel on said power shaft, and means for moving said second friction wheel into engagement with said first named friction wheel.

9. A change speed gearing comprising in combination, a driving wheel provided with a plurality of change speed faces, a driven shaft, a driven wheel on said shaft for engagement with said speed faces, a frame carrying said driven shaft and pivoted to swing said driven wheel into engagement with said speed faces, a power shaft coaxially arranged with respect to the pivot of said frame, and devices connected with said driven and power shaft for operatively connecting the same.

10. A change speed gearing comprising in combination, a driving wheel provided with a plurality of change speed faces, a driven shaft, a driven wheel on said shaft for engagement with said speed faces, a frame carrying said driven shaft and pivoted to swing said driven wheel into engagement with said speed faces, a power shaft coaxially arranged with respect to the pivot of said frame, and coacting devices operatively related with said driven and power shafts whereby the latter may be operated in the same or in a reverse direction with respect to the direction of rotation of said driven shaft.

11. A change speed gearing comprising in combination, a driving wheel provided with a plurality of change speed faces, a driven shaft, a driven wheel on said shaft for engagement with said speed faces, a frame carrying said driven shaft and pivoted to swing said driven wheel into engagement with said speed faces, a power shaft coaxially arranged with respect to the pivot of said frame, devices operated by said driven shaft, and an element on said power shaft arranged for movement in opposite directions to alternately engage said devices, for the purpose set forth.

12. A change speed gearing comprising in combination, a driving wheel provided with a plurality of change speed faces, a driven shaft, a driven wheel on said shaft for engagement with said speed faces, a movably mounted frame carrying said driven shaft and arranged to move said driven wheel into engagement with said speed faces, a friction wheel on said driven shaft, a power shaft, a second friction wheel slidably mounted on said power shaft, and means for moving said second friction wheel into and out of engagement with said first named friction wheel.

In testimony whereof I affix my signature in presence of two witnesses.

JOHANN FRIEDRICH APPINGER.

Witnesses:
HEINRICH FIETH,
OSCAR BOCK.